(12) United States Patent
Veeraswamy et al.

(10) Patent No.: US 7,870,356 B1
(45) Date of Patent: Jan. 11, 2011

(54) CREATION OF SNAPSHOT COPIES USING A SPARSE FILE FOR KEEPING A RECORD OF CHANGED BLOCKS

(75) Inventors: Sairam Veeraswamy, Westborough, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 994 days.

(21) Appl. No.: 11/678,049

(22) Filed: Feb. 22, 2007

(51) Int. Cl.
*G06F 12/00* (2006.01)
*G06F 13/00* (2006.01)

(52) U.S. Cl. .................. 711/162; 711/100; 711/154; 711/163

(58) Field of Classification Search ............ 711/100, 711/154, 162, 163
See application file for complete search history.

(56) References Cited

U.S. PATENT DOCUMENTS

| | | | |
|---|---|---|---|
| 5,526,482 A | 6/1996 | Stallmo et al. | |
| 5,790,773 A | 8/1998 | DeKoning et al. | |
| 5,819,292 A | 10/1998 | Hitz et al. | |
| 5,893,140 A | 4/1999 | Vahalia et al. | |
| 6,081,875 A | 6/2000 | Clifton et al. | |
| 6,434,681 B1 | 8/2002 | Armangau | |
| 6,453,383 B1 | 9/2002 | Stoddard et al. | |
| 6,594,745 B2 | 7/2003 | Grover | |
| 6,748,504 B2 * | 6/2004 | Sawdon et al. ............ | 711/162 |
| 6,907,505 B2 | 6/2005 | Cochran et al. | |
| 6,934,822 B2 | 8/2005 | Armangau | |
| 6,957,362 B2 | 10/2005 | Armangau | |
| 7,035,881 B2 | 4/2006 | Tummala et al. | |
| 7,076,509 B1 | 7/2006 | Chen et al. | |
| 7,085,909 B2 | 8/2006 | Ananthanarayanan et al. | |
| 7,165,158 B1 | 1/2007 | Yagawa | |
| 7,457,982 B2 * | 11/2008 | Rajan ...................... | 714/15 |
| 2004/0030668 A1 | 2/2004 | Pawlowski et al. | |
| 2004/0030822 A1 | 2/2004 | Rajan et al. | |
| 2005/0015663 A1 | 1/2005 | Armangau et al. | |
| 2005/0066095 A1 | 3/2005 | Mullick et al. | |
| 2005/0246382 A1 | 11/2005 | Edwards | |

(Continued)

OTHER PUBLICATIONS

Uresh Vahalia, Unix Internals: The New Frontiers, Chapter 9, "File System Implementations," and Chapter 11, Advanced File Systems, 1996, p. 261-289, 338-371, Prentice-Hall, Inc., Upper Saddle River, New Jersey.

(Continued)

*Primary Examiner*—Tuan V. Thai
(74) *Attorney, Agent, or Firm*—Richard Auchterlonie; Novak Druce & Quigg, LLP

(57) ABSTRACT

A snapshot copy facility responds to a request for writing new data to a block of a production dataset by saving original data of the block, and writing the new data to the block of the production dataset and keeping a record of the blocks of the production dataset have been changed since the point in time when the snapshot copy was created. For detection of corruption of the snapshot metadata and for portability of the snapshot copy software, a sparse file is used for keeping a record of the blocks of the production dataset that have been changed since the snapshot. For "copy on first write" snapshots, the sparse file is a "write once read many" (WORM) file to store old data of blocks. For "remap on write" snapshots, the sparse file is a "read-write" (RW) file to which writes to the production file are stored.

20 Claims, 15 Drawing Sheets

U.S. PATENT DOCUMENTS

2005/0256859 A1    11/2005    Keohane et al.
2006/0143412 A1    6/2006    Armangau
2006/0212481 A1*    9/2006    Stacey et al. ............. 707/104.1
2007/0136548 A1    6/2007    Mane

OTHER PUBLICATIONS

"Celerra File Server Architecture for High Availability," Aug. 1999, 11 pages, EMC Corporation, Hopkinton, Mass.

"Celerra File Server in the E-Infostructure," 2000, 12 pages, EMC Corporation, Hopkinton, Mass.

"Enginuity: The Symmetrix Storage Operating Environment," EMC White Paper, Jul. 2005, 21 pages, EMC Corporation, Hopkinton, Mass.

"EMC Replication Manager /SE," Data Sheet, May 2005, 4 pages, EMC Corporation, Hopkinton, Mass.

fsck(8)—Linux man page, printed Jun. 30, 2006, 3 pages, die.net.

Uresh Vahalia, Cary C. Gray, Dennis Ting, Metadata Logging in an NFS Server, USENIX 1995, Jan. 16-20, 1995, New Orleans, Louisiana, 12 pages, the USENIX Association, Berkeley, CA.

Chutani, Sailesh, et al., "The Episode File System," Jun. 1991, 18 pages, Carnegie Mellon University IT Center, Pittsburg, PA.

Philip Trautman and Jim Mostek, "Scalability and Performance in Modern File Systems," printed May 6, 2005. 18 pages, Silicon Graphics, Mountain View, CA.

Juan I. Santos Florido, Journal File Systems, Linux Gazette, Jul. 2000, Issue 55, 11 pages, Linux Journal, Seattle, WA.

* cited by examiner

US 7,870,356 B1

CREATION OF SNAPSHOT COPIES USING A SPARSE FILE FOR KEEPING A RECORD OF CHANGED BLOCKS

FIELD OF THE INVENTION

The present invention relates generally to computer data storage and backup, and more particularly to the creation of a snapshot copy of a production dataset concurrent with read-write access to the production dataset.

BACKGROUND OF THE INVENTION

A snapshot copy of a production dataset contains the state of the production dataset at a respective point in time when the snapshot copy is created. A snapshot copy facility can create a snapshot copy without any substantial disruption to concurrent read-write access to the production dataset. Typically the dataset is a logical volume, a file system, or a file, and the snapshot copy facility is especially adapted to make a snapshot copy of a logical volume or file system or file. Snapshot copies have been used for a variety of data processing and storage management functions such as storage backup, transaction processing, and software debugging.

There are two well-known methods of making a snapshot copy of a production dataset. One is called "copy on first write" and the other is called "remap on write." In either method, a record is kept of whether each block of the production dataset has been modified since the time of the snapshot.

For example, a snapshot copy facility that uses the "copy on first write" method to make a snapshot copy of a logical volume is described in Armangau et al., "Organization of multiple snapshot copies in a data storage system," U.S. Pat. No. 6,934,822 issued Aug. 23, 2005, and incorporated herein by reference. A bit map keeps a record of logical blocks that have been modified since the time of the snapshot, and a block map indicates where the old data of each modified block can be found in a save volume. Such a snapshot copy facility can be adapted to maintain read-write snapshot copies, as described in Tummala et al., "Organization of read-write snapshot copies in a data storage system," U.S. Pat. No. 7,035,881 issued Apr. 25, 2006, incorporated herein by reference.

A snapshot copy facility that uses a hybrid of the "copy on first write" method and the "remap on write" method is described in Philippe Armangau, "Snapshot copy facility maintaining read performance and write performance," U.S. Patent Application Publication 2006/014341 published Jun. 29, 2006, incorporated herein by reference.

A snapshot copy facility that uses a variation of the "remap on write" method to make a snapshot copy of a particular file system or file is described in Bixby et al., "Maintenance of a file version set including read-only and read-write snapshot copies of a production file," U.S. Patent Application Publication US 2005/0065986 published Mar. 24, 2005, incorporated herein by reference. When first writing to a production file after the time of the snapshot, a new inode for the snapshot copy of the production file is created, and the content of the production file is copied to the snapshot copy inode. New data for the production file is written to newly allocated blocks and these newly allocated blocks are linked to the inode of the production file. Blocks of old data remain linked to the inode for the snapshot copy.

Users are becoming less tolerant of delays in accessing their data, and even less tolerant of corruption of their data. Therefore, there has been a continuing interest in improving data availability and the effectiveness of recovery procedures. At the same time, users often demand that applications be portable among different processor platforms and versions of operating systems.

Portability of an application is typically ensured by structured programming at a high level of abstraction, and by sufficient testing and certification. These considerations have been problematic for the programming of a snapshot copy facility. During normal operation, the snapshot copy facility competes with client access to primary cache memory. Applications that impact performance are often programmed at a low level of abstraction for most efficient use of memory and processor resources. After a disruption to normal operation necessitating a server reboot, the snapshot copies are often needed for recovery. Since a disruption to normal operation necessitating a server reboot is often caused by a hidden operating system bug or incompatibility with the hardware platform, it is difficult to devise a testing methodology for ensuring that snapshot copies will not be corrupted by such a hidden operating system bug or incompatibility with the hardware platform.

SUMMARY OF THE INVENTION

In general, a snapshot copy facility must keep a record of the blocks of a production dataset have been changed since the point in time when the snapshot copy was created. There has been considerable complexity in keeping such a record of the blocks of the production dataset have been changed, and in keeping track of the locations of the original and new data for each block that has been changed. There is a desire that this be done with efficient use of primary cache memory and processor resources, yet it also desired that this be done in such a way as to contain faults and facilitate recovery after a disruption necessitating a reboot of the processor. These problems are solved by using a sparse file to store the original or new data of the blocks that have changed so that the metadata of the sparse file keeps a record of the blocks of the production dataset that have been changed since the point in time when the snapshot was created. Therefore, a conventional file system recovery tool (e.g., FSCK) can operate upon the sparse file to detect corruption of the snapshot copy metadata. Portability and efficient programming of the snapshot copy facility are virtually guaranteed by portability of the operating system and efficient programming of its file system manager.

In accordance with one aspect, the invention provides a method of operating at least one data processor for maintaining a production dataset in computer data storage, and during concurrent read-write access to the production dataset, also maintaining a snapshot copy of the production dataset in the computer data storage. The snapshot copy is the state of the production dataset at a point in time when the snapshot copy is created. The production dataset and the snapshot copy of the production dataset include blocks of computer data. The method includes responding to a request for writing new data to a block of the production dataset by saving original data of the block of the production dataset, and writing the new data to the block of the production dataset, and keeping a record that the block has been changed in the production dataset since the point in time when the snapshot copy was created. The record that the block has been changed in the production dataset since the point in time when the snapshot copy was created is kept by writing the new data or the original data to a sparse file so that blocks of the production dataset that have been changed since the point in time when the snapshot copy was created are indicated by a block allocation map of the sparse file.

In accordance with another aspect, the invention provides a file server. The file server includes computer data storage; and at least one data processor coupled to the computer data storage for writing computer data to the computer data storage and for reading the computer data from the computer data storage. The at least one data processor is programmed for maintaining a production dataset in the computer data storage, and during concurrent read-write access to the production dataset, also maintaining a snapshot copy of the production dataset in the computer data storage. The snapshot copy is the state of the production dataset at a point in time when the snapshot copy is created. The production dataset and the snapshot copy of the production dataset include blocks of the computer data. The at least one data processor is programmed for responding to a request for writing new data to a block of the production dataset by saving original data of the block of the production dataset, and writing the new data to the block of the production dataset, and keeping a record that the block has been changed in the production dataset since the point in time when the snapshot copy was created. The at least one data processor is programmed for keeping the record that the block has been changed in the production dataset by writing the new data or the original data to a sparse file so that blocks of the production dataset that have been changed since the point in time when the snapshot copy was created are indicated by a block allocation map of the sparse file.

In accordance with still another aspect, the invention provides a file server. The file server includes computer data storage, and at least one data processor coupled to the computer data storage for writing computer data to the computer data storage and reading the computer data from the computer data storage. The at least one data processor is programmed with an operating system including a file system manager program for managing sparse files stored in the computer data storage. The at least one data processor is also programmed with a snapshot copy facility program for maintaining a production dataset in computer data storage, and during concurrent read-write access to the production dataset, also maintaining a snapshot copy of the production dataset, the snapshot copy being the state of the production dataset at a point in time when the snapshot copy is created. The production dataset includes blocks of the computer data, and the snapshot copy of the production dataset also includes blocks of the computer data. The snapshot copy facility program is executable by said at least one data processor for responding to a request for writing new data to a block of the production dataset by saving original data of the block of the production dataset, and writing the new data to the block of the production dataset and keeping a record that the block of the production dataset has been changed since the point in time when the snapshot copy was created. The snapshot copy facility program is executable by said at least one data processor for keeping the record that the block of the production dataset has been changed by writing the new data or the original data to a sparse file so that blocks of the production dataset that have been changed since the point in time when the snapshot copy was created are indicated by a block allocation map of the sparse file. The snapshot copy facility is executable by said at least one data processor for responding to a request for reading a specified block of the production dataset or the snapshot copy by accessing the allocation map of the sparse file to determine whether or not the specified block is allocated in the sparse file, and upon determining that the specified block is allocated in the sparse file, reading the specified block from the sparse file. Moreover, the file system manager includes an application program interface that is callable by the snapshot copy facility program for determining whether or not the specified block is allocated in the sparse file.

BRIEF DESCRIPTION OF THE DRAWINGS

Additional features and advantages of the invention will be described below with reference to the drawings, in which.

Figure 1:
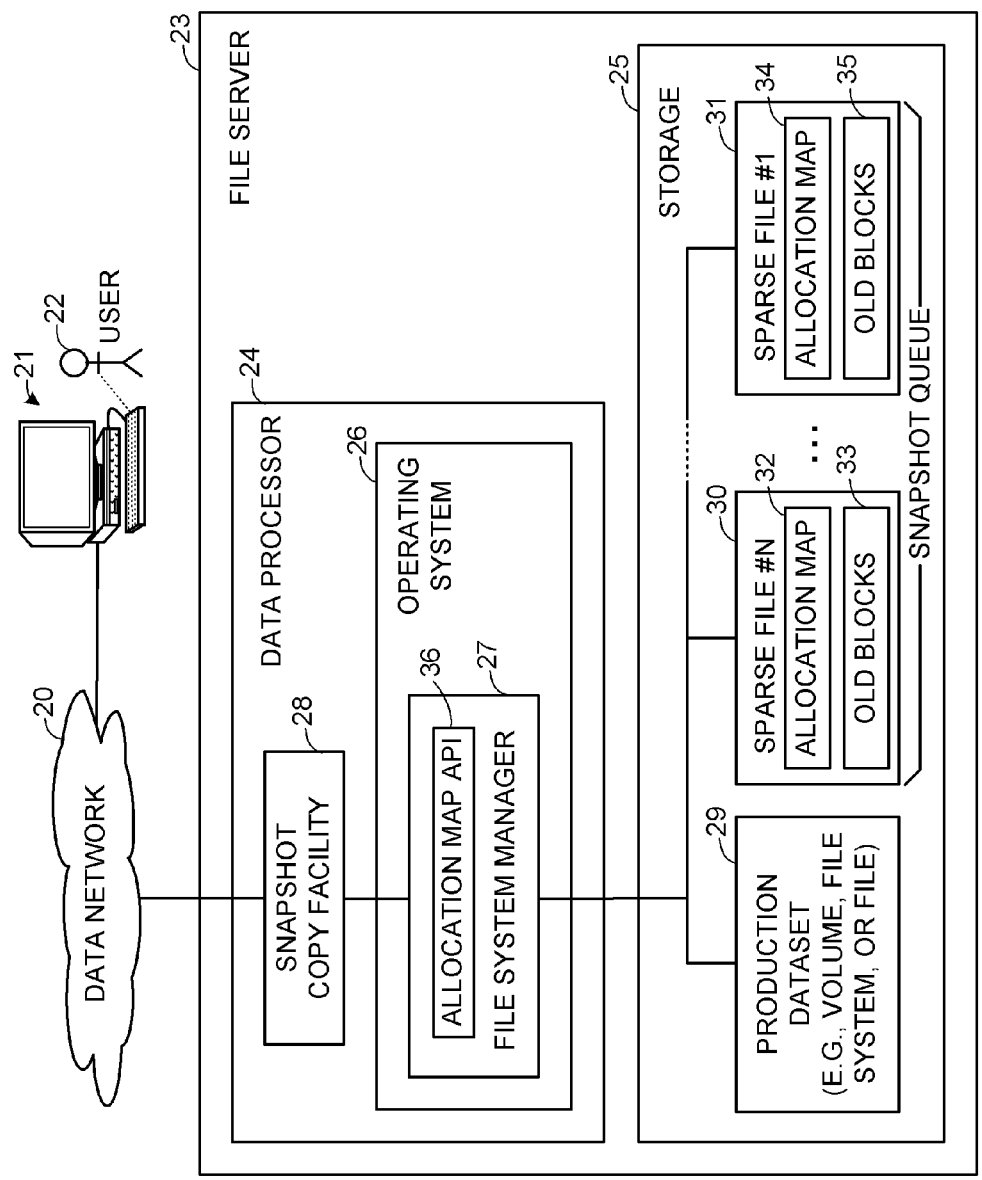
FIG. 1 is block diagram of a data processing system including a snapshot copy facility using a "copy on first write" method and sparse files for keeping a record of changed data blocks.

While the invention is susceptible to various modifications and alternative forms, specific embodiments thereof has been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a data network 20 linking a workstation 21 of a user 22 to a file server 23. The file server has at least one data processor 24 and computer data storage 25. The data processor 24, for example, is a commodity computer, and the computer data storage 25 is an array of disk drives. The file server may include multiple data processors that share an array of disk drives, for example, as described in Vahalia et al. U.S. Pat. No. 5,893,140 issued Apr. 6, 1999, incorporated herein by reference.

The data processor 24 is programmed with an operating system 26 including a file system manager 27 for storing data in files, and for indexing the files in directories. For example, the operating system is a version of the UNIX operating system, and the files and directories are arranged in a hierarchy, as further described in described in Uresh Vahalia, *Unix Internals: The New Frontiers*, Chapter 9, "File System Implementations," Prentice-Hall, Inc., New Jersey, 1996, p. 261-289.

Typically the storage 25 is subdivided into logical volumes, and one or more file systems can be contained in a logical volume. Each logical volume is comprised of logical blocks of data. In a similar fashion, a file system or file is comprised of file system blocks of data, but the file system blocks need not be contiguous in the logical address space of the logical volume containing the file system. Because the file system blocks need not be contiguous, the file system blocks are linked together by pointers to form the files and file systems.

In general, the computer data of a client or application is organized into a dataset in the storage 25. The operating system 26 provides facilities for allocation and access to certain kinds of datasets such as volumes, file systems, and files. A client or system application program may itself define a dataset format. In most cases, for storage allocation and mapping, a dataset is comprised of blocks of data. Each block of data includes multiple bytes, although the block size in bytes need not be fixed.

For data backup and recovery, transaction processing, and software debugging, the data processor 24 is programmed with a snapshot copy facility 28 for making point-in-time copies of an active dataset 29 during read-write access by a client of the file server or during read-write access by other application programs of the data processor 24. This process is commonly referred to as making a snapshot copy of a production dataset. The snapshot copy is the state of the production dataset at a point in time when the snapshot copy is created. The snapshot copy facility 28 can create a snapshot copy without any substantial disruption to concurrent read-write access to the production dataset 29.

As discussed above, there are two well-known methods of making a snapshot copy of a production dataset. The first is called "copy on first write" and the second is called "remap on write." In either method, a record is kept of whether or not each block of the production dataset has been modified since the pint in time when the snapshot is created. There has been considerable complexity in keeping such a record of the blocks of the production dataset have been changed, and in keeping track of the locations of the original and new data for each block that has been changed. There is a desire that this be done with efficient use of primary cache memory and processor resources, yet it also desired that this be done in such a way as to contain faults and facilitate recovery after a disruption necessitating a reboot of the processor. These problems are solved by using a sparse file to store the original or new data of the blocks that have been changed so that the metadata of the sparse file keeps a record of the blocks of the production dataset have been changed.

FIG. 1 shows an example of the snapshot copy facility 28 using the "copy on first write" method to make a series of snapshot copies of the production dataset 29. The snapshot copy facility 28 creates a snapshot queue of sparse files 30, 31, including a respective sparse file for each of the snapshot copies. Each sparse file 30, 31 in the snapshot queue has an allocation map 32, 34 and stores the old blocks 33, 35 of the production data set 29 that have been changed from the time that the snapshot of the sparse file was created until the time that snapshot of the next sparse file was created. The file system manager 27 is provided with a new application program interface (API) 36 for accessing the block allocation map of a sparse file in order to determine whether or not a specified block has been allocated in the sparse file.

Figure 2:
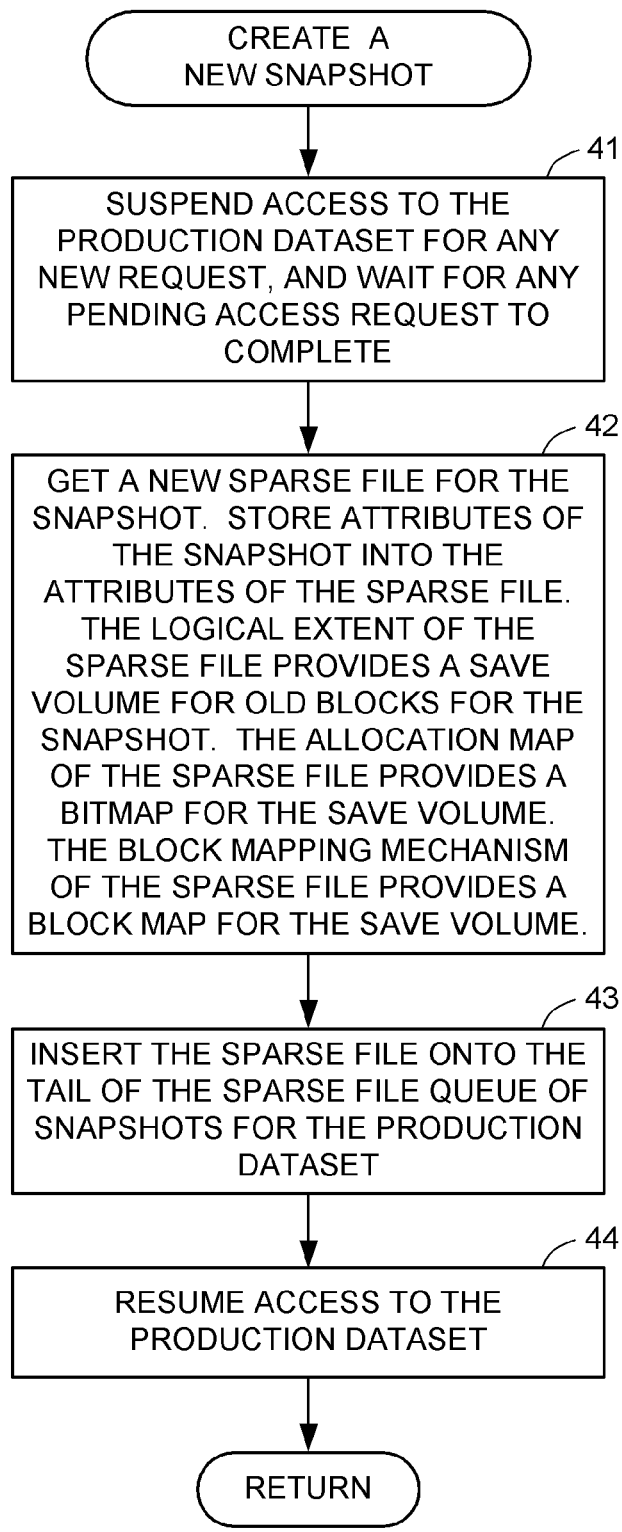
FIG. 2 is a flowchart of a procedure used by the snapshot copy facility in FIG. 1 for creating a new snapshot copy of a production dataset.

FIG. 2 shows how the snapshot copy facility in FIG. 1 creates a new snapshot copy of the production dataset. In a first step 41, the snapshot copy facility suspends access to the production dataset for any new request, and waits for any pending access request to complete. In this fashion, the production dataset is brought to a consistent state suitable for backup and recovery. Next, in step 42, the snapshot copy facility gets a new sparse file for the snapshot. For example, a pool of such sparse files is kept ready by a background process. The snapshot copy facility stores attributes of the snapshot into the attributes of the sparse file. For example, the sparse file inherits the size, name, and last modification time of the production dataset at the time that the snapshot is made. The logical extent of the sparse file provides a save volume for old blocks for the snapshot, the allocation map of the sparse file provides a bitmap of the save volume, and the block mapping mechanism of the sparse file provides a block map for the save volume. In step 43, the snapshot copy facility inserts the sparse file onto the tail of the sparse file queue of snapshots for the production dataset. In step 44, the snapshot copy facility resumes access to the production dataset.

Figure 3:
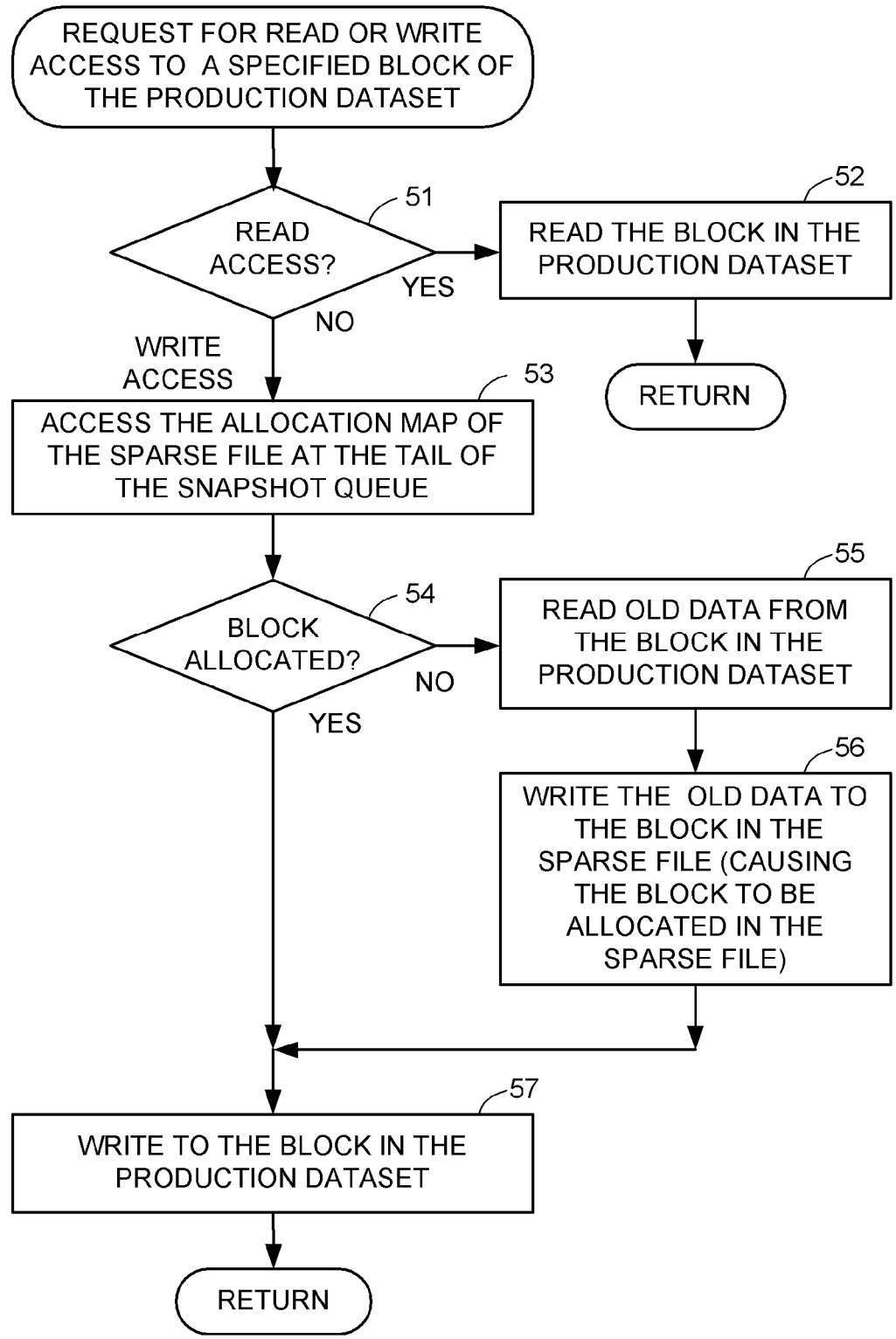
FIG. 3 is a flowchart of a procedure used by the snapshot copy facility in FIG. 1 for responding to a client request for read or write access to a specified block of the production dataset.

FIG. 3 show how the snapshot copy facility responds to a client request for read or write access to a specified block of the production dataset. In a first step 51, execution branches to step 52 for a read access. In step 52, the specified block is read from the production dataset, and the data read from the block is returned to the requesting client. In step 51, for write access, execution continues to step 53. In step 53, the snapshot copy facility accesses the allocation map of the sparse file at the tail of the snapshot queue in order to determine whether the specified block is allocated in the sparse file. If not, then this is the first time that a write to the specified block of the production dataset was requested since the creation of the last snapshot, so execution branches from step 54 to step 55 to read old data from the specified block in the production dataset, and then in step 56 the old data is written to the specified block in the sparse file. This causes a block for the old data to be allocated in the sparse file. If a block was allocated in step 54, or after step 56, execution continues to step 57. In step 57, the new data is written to the specified block in the production dataset, and execution returns.

Figure 4:
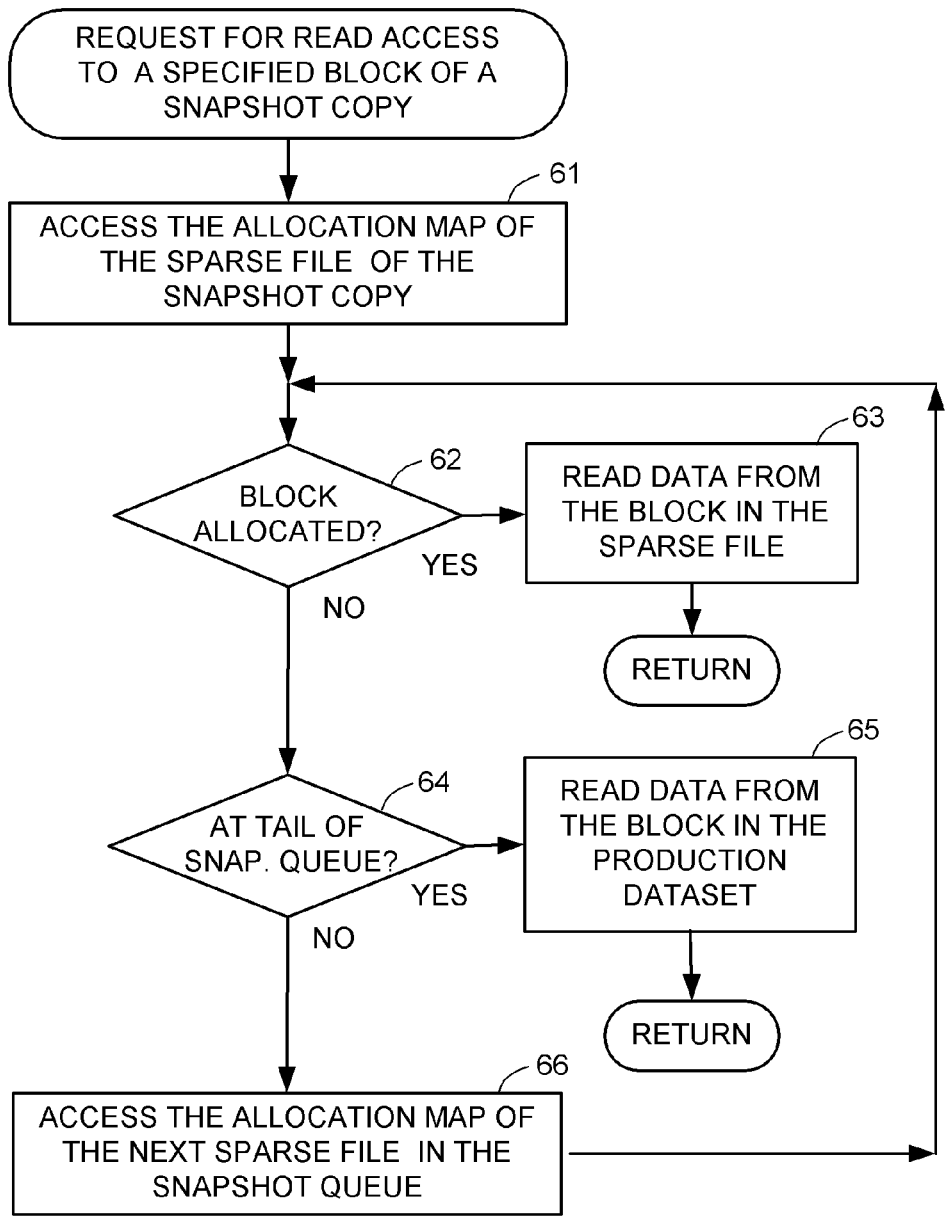
FIG. 4 is a flowchart of a procedure used by the snapshot copy facility in FIG. 1 for responding to a client request for read access to a specified block of a snapshot copy.

FIG. 4 shows how the snapshot copy facility in FIG. 1 responds to a client request for read access to a specified block of a snapshot copy. In step 61, the snapshot copy facility accesses the allocation map of the sparse file of the snapshot copy to determine whether or not the specified block is allocated in the sparse file. If so, then execution branches from step 62 to step 63 to read data from the block in the sparse file, and to return the data to the requesting client. In step 62, if a block is not allocation, then execution continues to step 64. In step 64, if the sparse file is at the tail of the snapshot queue, then execution branches to step 65 to read data from the specified block in the production dataset, and to return the data to the requesting client. In step 64, if the sparse file is not at the tail of the snapshot queue, then in step 66, the snapshot copy facility accesses the allocation map of the next sparse file in the snapshot queue, and execution loops back to step 62.

Figure 5:
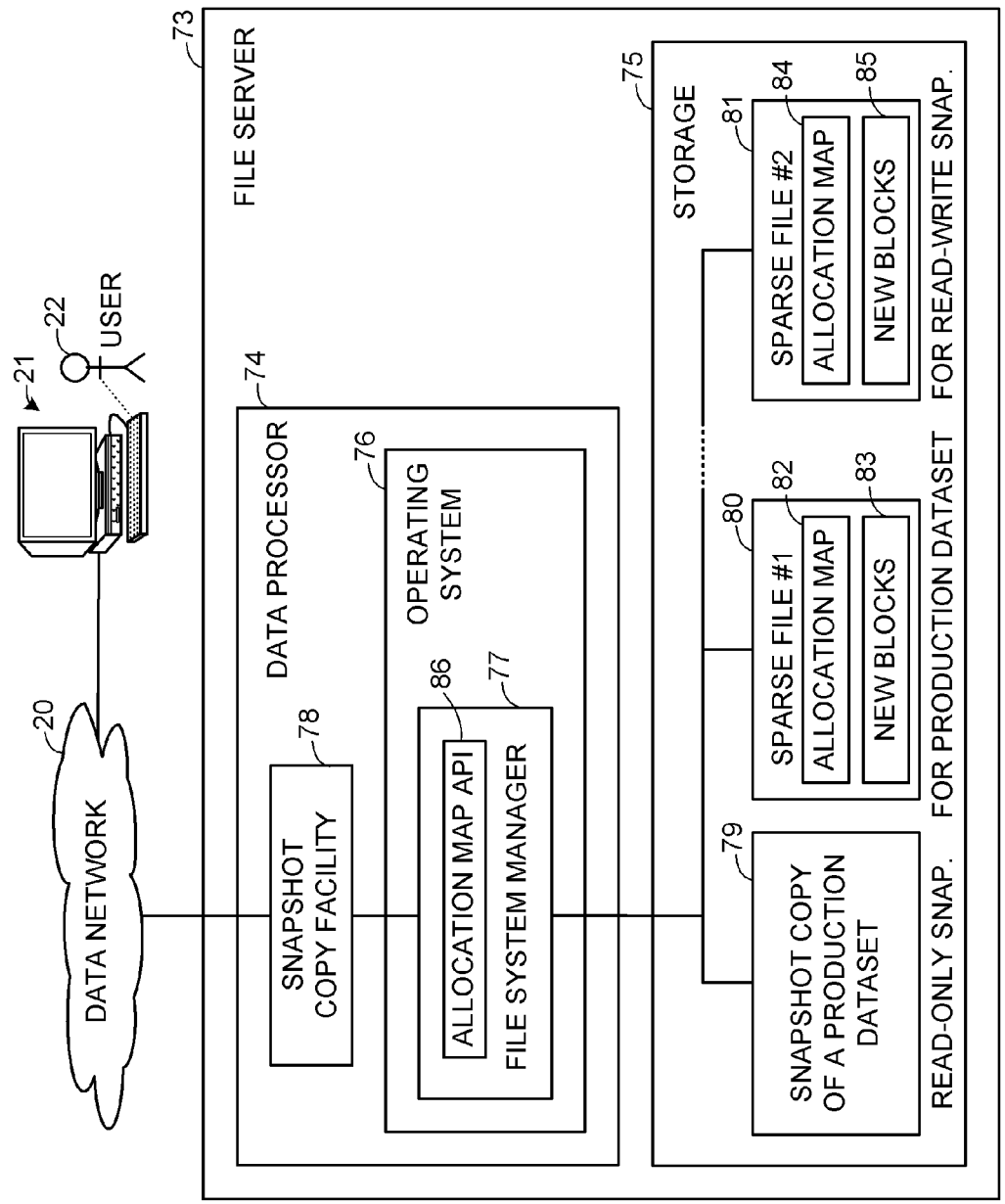
FIG. 5 is block diagram of a data processing system including a snapshot copy facility using a "remap on write" method and sparse files for keeping a record of changed data blocks.

FIG. 5 shows a data processing system including a snapshot copy facility 78 using a "remap on write" method and sparse files for keeping a record of changed data blocks. The data processing system of FIG. 5 has a file server 72 including a data processor 74 and storage 75. The data processor 74 is programmed with an operating system 76 having a file system manager 77. The data processor 74 is also programmed with the snapshot copy facility 78. In this case, the user 22 requests the snapshot copy facility 78 to create a read-write or "writable" snapshot copy. The snapshot copy facility 78 responds by "freezing" the production dataset into a read-only snapshot copy 79, using a first sparse file 80 to store new blocks 83 of the production dataset since the read-only snapshot was created, and using a second sparse file 81 to store new blocks 85 of the read-write snapshot copy. The file system manager 77 is provided with a new application program interface (API) 86 for accessing the block allocation map 82, 84 of each sparse file in order to determine whether or not a specified block has been allocated in each sparse file.

In practice, the read-only snapshot copy 79 and the read-write snapshot copy can be used for testing or for recovery after possible corruption of the dataset. For example, a system administrator may run a diagnostic program upon the read-write snapshot concurrent with client read-write access to the production dataset. If the system administrator finds a problem, then the system administrator may halt client access, repair the read-only snapshot copy, and resume client access.

Figure 6:
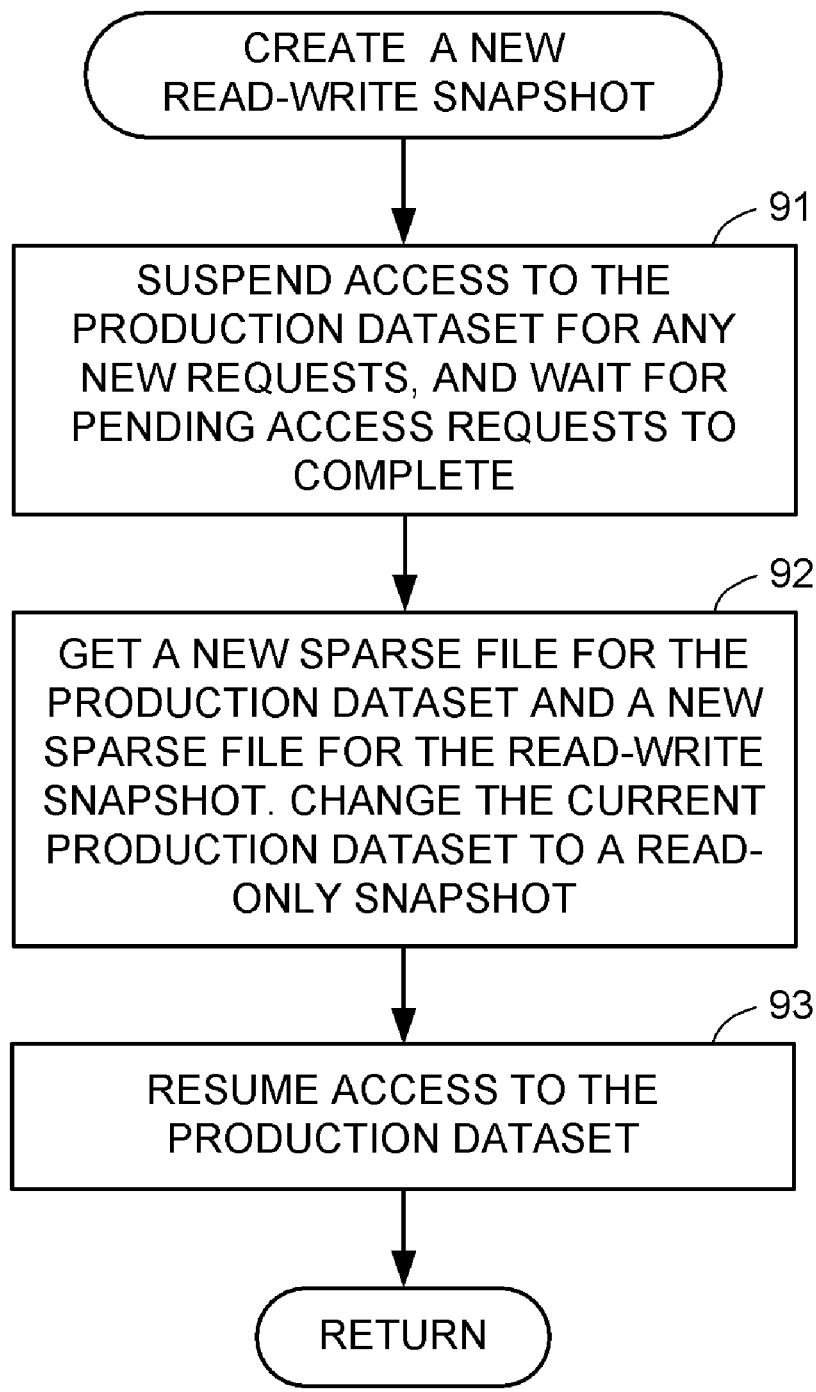
FIG. 6 is a flowchart of a procedure used by the snapshot copy facility of FIG. 5 for creating a new read-write snapshot copy of a production dataset.

FIG. 6 shows how the snapshot copy facility of FIG. 5 creates a new read-write snapshot copy of a production dataset. In step 91, the snapshot copy facility suspends access to the production dataset for any new requests, and waits for pending access requests to complete. In step 92, the snapshot copy facility gets a new sparse file for the production dataset and a new sparse file for the read-write snapshot, and changes the current production dataset to a read-only snapshot. In step 93, the snapshot copy facility resumes access to the production dataset.

Figure 7:
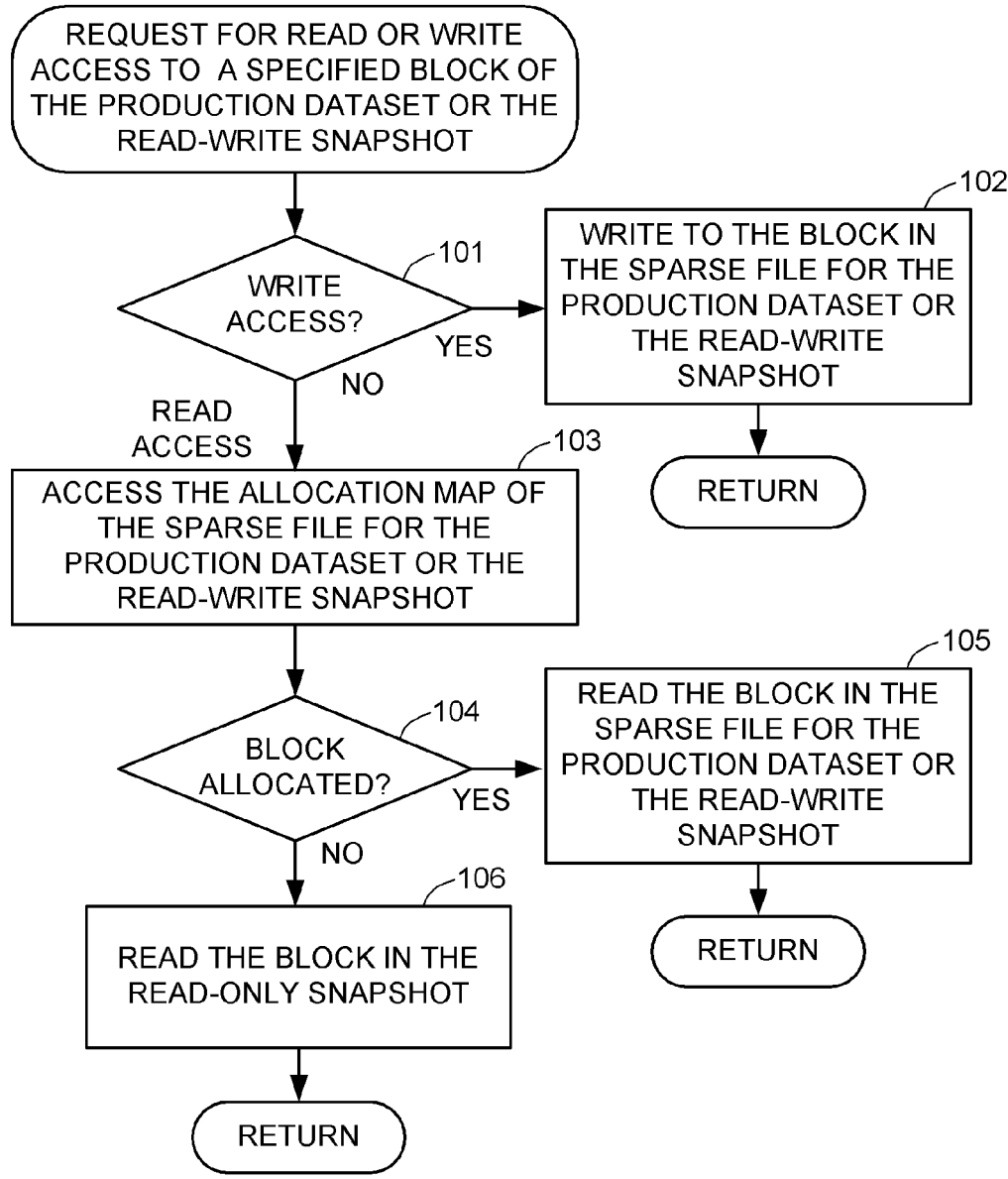
FIG. 7 is a flowchart of a procedure used by the snapshot copy facility of FIG. 5 for responding to a client request for read or write access to a specified block of the production dataset or the read-write snapshot.

FIG. 7 shows how the snapshot copy facility of FIG. 5 responds to a client request for read or write access to a specified block of the production dataset or the read-write snapshot. In a first step 101, for write access, execution branches to step 102. In step 102, data is written to the specified block in the sparse file for the production dataset (for a request to write to the production dataset), or to the specified block in the sparse file for the read-write snapshot (for a request to write to the read-write snapshot), and execution returns. In step 101, for read access, execution continues to step 103. In step 103, the snapshot copy facility accesses the allocation map of the sparse file for the production dataset or the read-write snapshot in order to determine if the specified block is allocated in the sparse file. If so, then execution branches to step 105 to read data from the specified block in the sparse file for the production dataset (for a request to read the production dataset), or to the specified block in the sparse file for the read-write snapshot (for a request to read the read-write snapshot), and the data is returned to the requesting client. In step 104, if the specified block is not allocated in the sparse file, then execution continues to step 106 to read data from the specified block in the read-only snapshot, and the data is returned to the requesting application.

The programming of a new snapshot copy facility as shown in FIGS. 1-7 may use conventional application program interfaces to the file system manager in combination with a new application program interface 36, 86 for accessing the block allocation map of a sparse file in order to determine whether or not a specified block of storage is allocated in the sparse file. For modifying some conventional kinds of snapshot copy facilities, it is convenient to provide a higher-level interface to the sparse file. This higher-level interface provides a sparse volume storage virtualization model.

Figure 8:
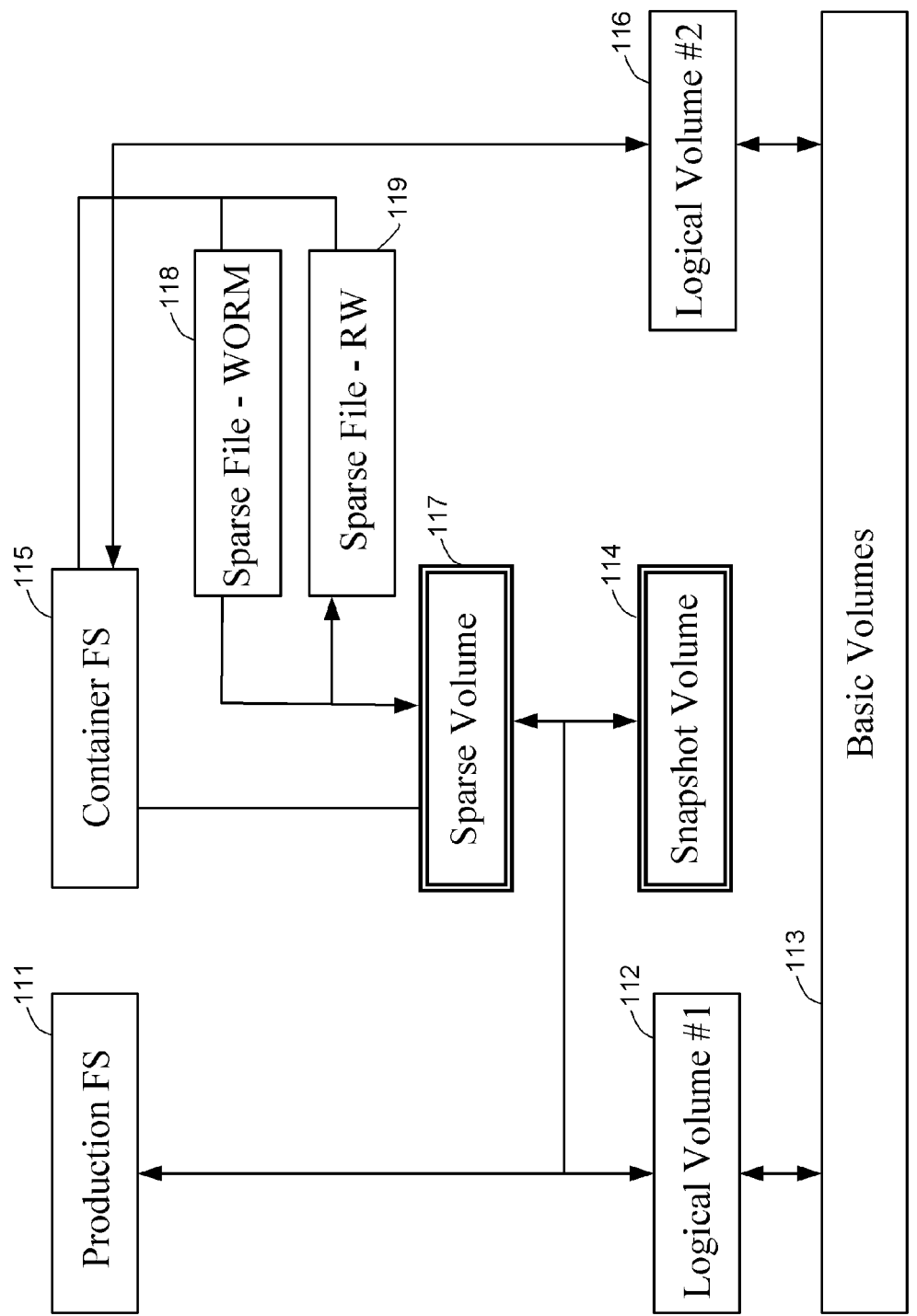
FIG. 8 is a block diagram of a software architecture for a snapshot copy facility using a sparse volume storage virtualization model as an interface to sparse files that keep a record of changed blocks.

FIG. 8 shows how a snapshot copy facility may use the sparse volume storage virtualization model. In a conventional fashion, a production file system 111 is contained in a first logical volume 112, and the first logical volume 112 is mapped to basic volumes 113 of back-end disk storage of the file server. In a conventional fashion, the snapshot copy facility copies old data from the logical volume to a snapshot volume 114 upon a first write to each block of the logical volume since the snapshot copy was created. The sparse volume 117 provides a bit map to the snapshot copy facility for indicating when such a first write occurs. However, the snapshot volume 114 is not simply a logical volume mapped to the basic volumes 113 of back-end disk storage. Instead, the sparse volume 117 maps the logical block address space of the snapshot volume into the logical extent of a write-once read-many (WORM) sparse file 118 that stores the old data blocks. In addition, the sparse volume 117 provides the bit map by accessing the block allocation map of the (WORM) sparse file 118. The WORM sparse file 118 is bound to the sparse volume 117 when the sparse volume is configured as backend store for snapshot volume 114. The maximum size of the WORM sparse file 118 is equal to the size of the first logical volume 112.

Figure 9:
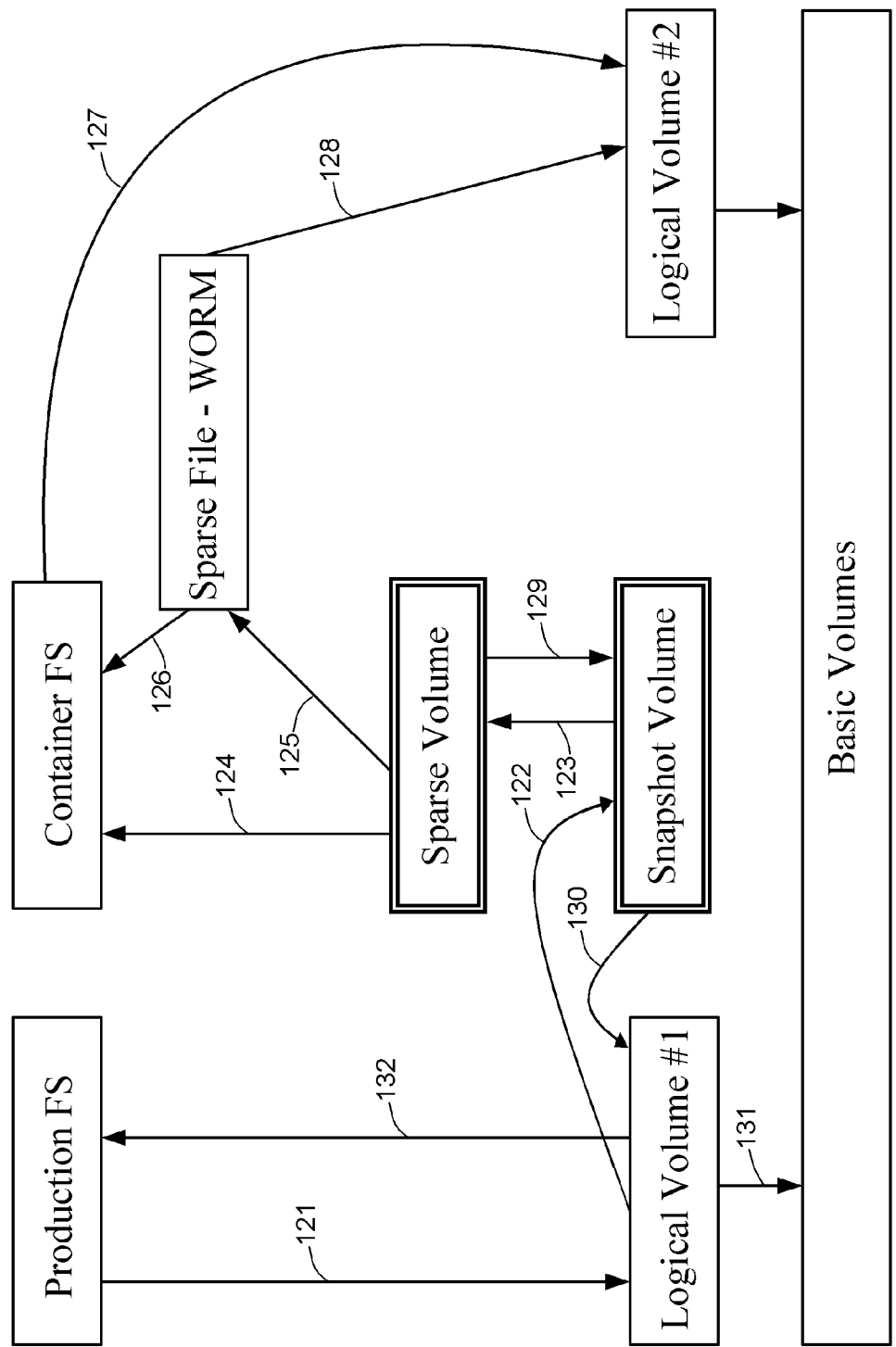
FIG. 9 shows data flow when the sparse volume of FIG. 8 is used as backend storage for a snapshot volume.

To create a read-write snapshot based on the read-only snapshot of snapshot volume 114, a read-write (RW) sparse file 119 is bound to the sparse volume 117. The maximum size of the RW sparse file 119 is equal to the size of the first logical volume 112. New data written to the read-write snapshot is written to the RW sparse file 119. When data is read from a block in the read-write snapshot, it is read from the RW sparse file 119 if the block is allocated in the RW sparse file, and otherwise the block is read from the read-only snapshot of the snapshot volume 114. The WORM sparse file 118 and the RW sparse file 119 are files in a container file system 115. Attributes of the sparse volume 117 are provided by another file in the container file system 115. The container file system 115 is itself contained in a second logical volume 116 mapped to storage in the basic volumes 113 of back-end disk storage FIG. 9 shows data flow when the sparse volume of FIG. 8 is used as backend storage for a snapshot volume. In step 121, the production file system writes a data block onto the first logical volume. In step 122, a snapshot filter redirects the write to the snapshot volume instance. In step 123, the snapshot volume redirects the write to the sparse volume. In step 124, the sparse volume checks with the container file system to determine whether the block has been written or not to the WORM sparse file. The container file system quickly looks at the allocation map corresponding to the block's offset within the WORM sparse file to determine whether the storage for the block has been allocated or not. In step 125, if the storage is allocated, then the block already has been written to since the snapshot was created. If the storage is not allocated, then the sparse volume reads the block from the first logical volume and writes it to the WORM sparse file. In step 126, the container file system internally allocates the storage for the block in the WORM sparse file. In step 127, the container file system logs the transaction that the block has been allocated. In step 128, the WORM sparse file then writes the data to its associated second logical volume either synchronously or asynchronously. In step 129, the sparse volume returns a confirmation to the snapshot volume. In step 130, the snapshot volume returns a confirmation to the first logical volume. In step 131, the first logical volume writes the block to the backend storage. In step 132, the first logical volume returns a confirmation to the production file system.

Figure 10:
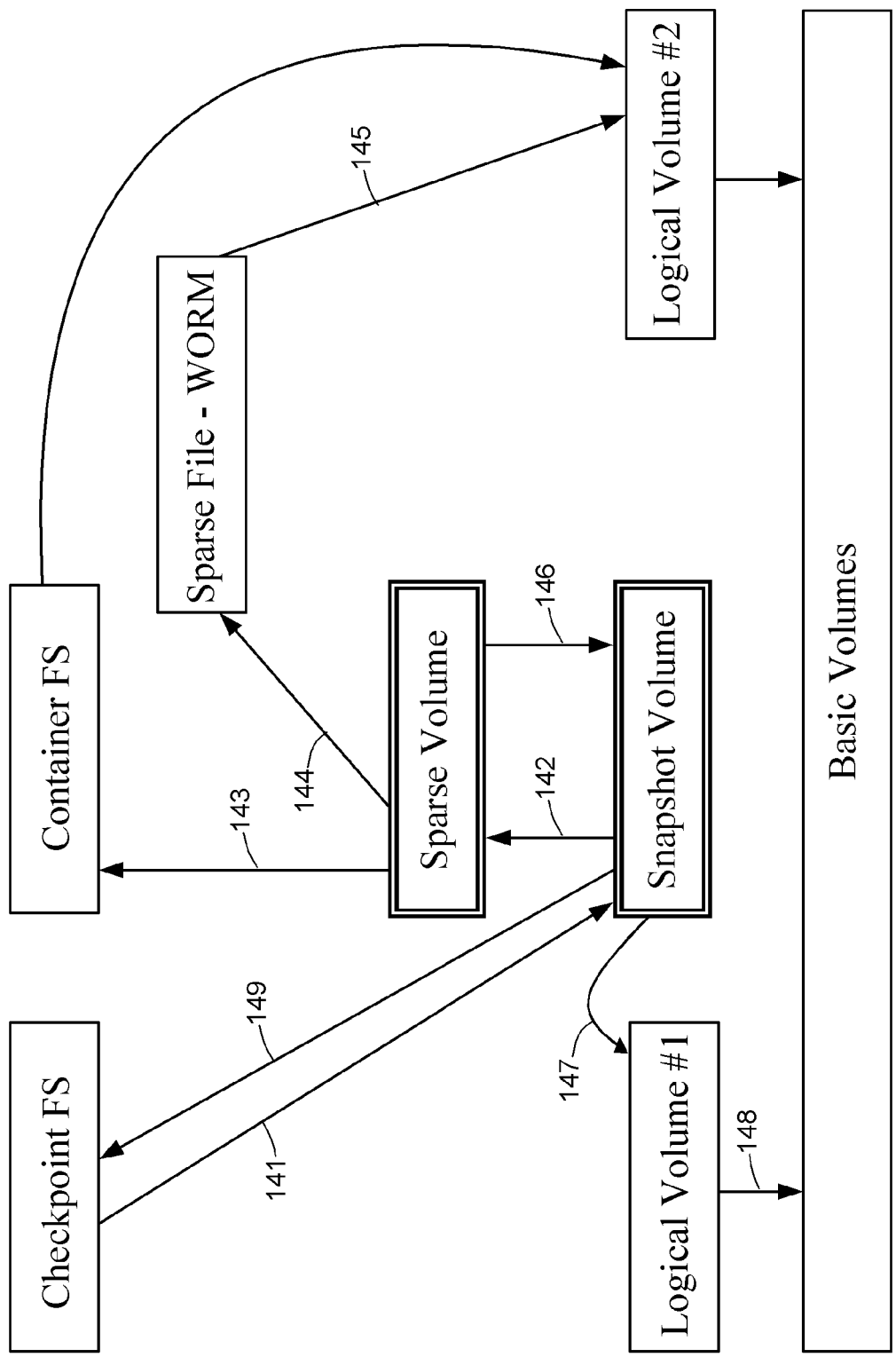
FIG. 10 shows data flow when the sparse volume of FIG. 8 is used as an interface to a snapshot file system mounted for read-only access.

FIG. 10 shows data flow when the sparse volume of FIG. 8 is used as an interface to a snapshot file system mounted for read-only access. The mounted snapshot file system is called a checkpoint file system. In step 141, the check point file system issues a read request to snapshot volume. In step 142, the snapshot volume checks with sparse volume to determine whether the block has been snapped or not. In step 143, the sparse volume checks with the container file system to determine whether a block for the specific offset within the WORM sparse file has been allocated or not. If the block has been allocated, meaning that it has been snapped already, then the sparse volume issues a read on the WORM sparse file. In step 145, the WORM sparse file reads the block from its associated second logical volume. In step 146, the sparse volume returns the data read from the block to the snapshot volume. In step 147, if the block has not been snapped, then the snapshot volume reads the block from the associated first logical volume. In step 148, the first logical volume reads the block from the basic volume that is mapped to the first logical volume. In step 149, the snapshot volume returns the block to the checkpoint file system.

Figure 11:
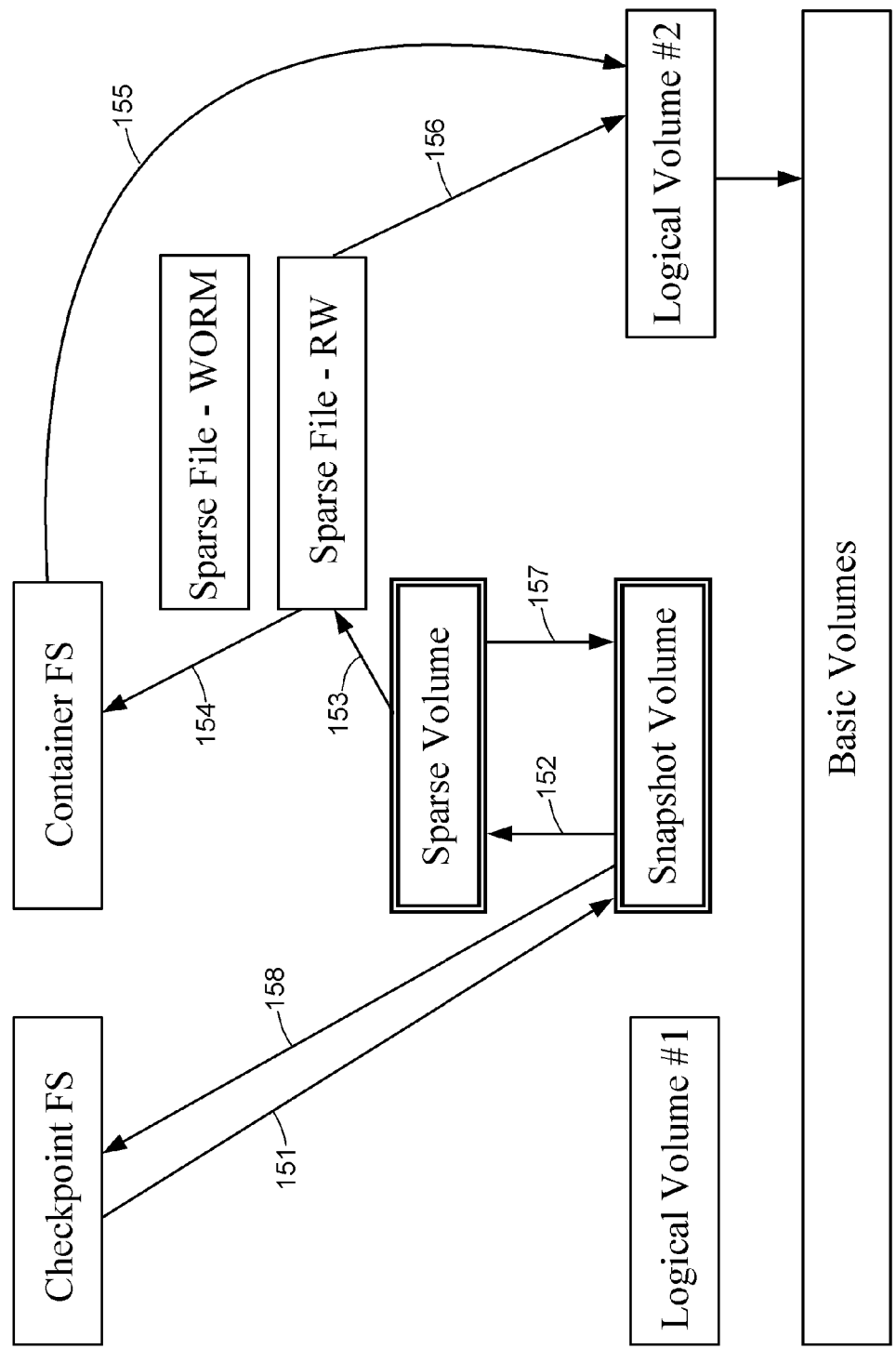
FIG. 11 shows data flow during a write operation when the sparse volume of FIG. 8 is used as an interface to a snapshot file system mounted for read-write access.

FIG. 11 shows data flow during a write operation when the sparse volume of FIG. 8 is used as an interface to a snapshot file system mounted for read-write access. Again, the mounted snapshot file system is called a checkpoint file system. When a checkpoint file system is made read-writable, the sparse volume associates a RW sparse file with the checkpoint file system. In step 151, the checkpoint file system invokes a write operation on the snapshot volume. In step 152, the snapshot volume redirects the write to the sparse volume. In step 153, the sparse volume writes the specified block onto the RW sparse file. In step 154, the RW sparse file allocates the storage for the block. In step 155, the container file system allocates the storage transactionally and commits the transaction to the log portion of the second logical volume. In step 156, the RW sparse file writes the block back to the second logical volume either synchronously or asynchronously. In step 157, the sparse volume returns an acknowledgement to the snapshot volume. In step 158, the snapshot volume returns an acknowledgement to the checkpoint file system.

Figure 12:
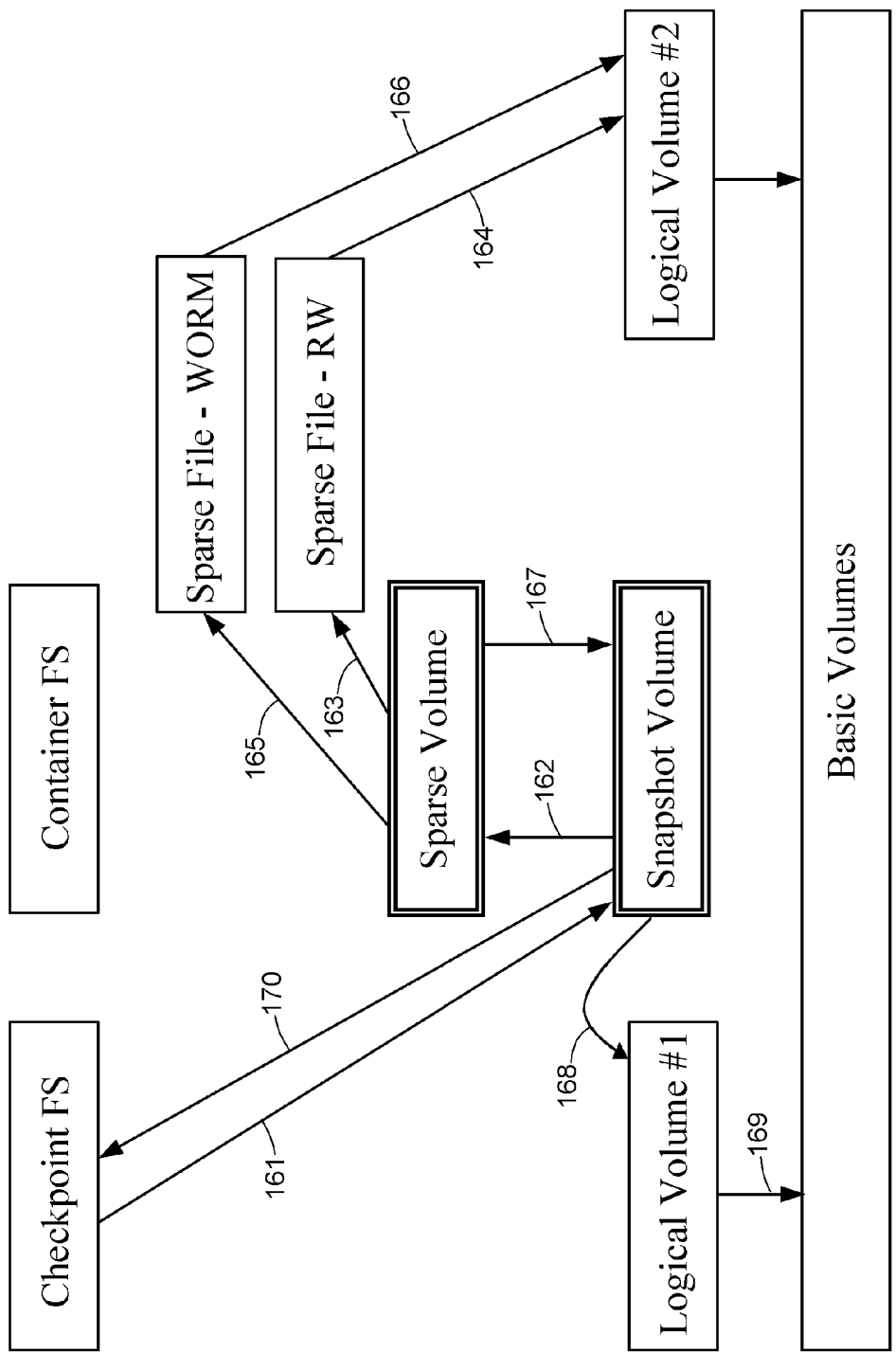
FIG. 12 shows data flow during a read operation when the sparse volume of FIG. 8 is used as an interface to a snapshot file system mounted for read-write access.

FIG. 12 shows data flow during a read operation when the sparse volume of FIG. 8 is used as an interface to a snapshot file system mounted for read-write access. In step 161, the checkpoint file system issues a read request to the snapshot volume. In step 162, the snapshot volume checks with the sparse volume to determine whether the block has been snapped. In step 163 the sparse volume first checks whether the checkpoint file system has updated the block by checking whether the block has been written to the RW sparse file. In step 164, if the block has been written to the RW sparse file, then the RW sparse file reads it from its associated second logical volume. In step 165, if the block has not been modified, then the sparse volume checks whether the block has been snapped by checking whether the block has been written to the WORM sparse file. In step 166, if the block been snapped, then the WORM sparse file reads the block from its associated second logical volume, and the second logical volume reads the block from the backend disk storage. In step 167, the sparse volume returns the data read from the block to the snapshot volume. In step 168, if the block has not been snapped, then the snapshot volume reads the block from the first logical volume. In step 169, the first logical volume reads the block from the backend disk storage. In step 170, the data read from the block is returned to the checkpoint file system.

Figure 13:
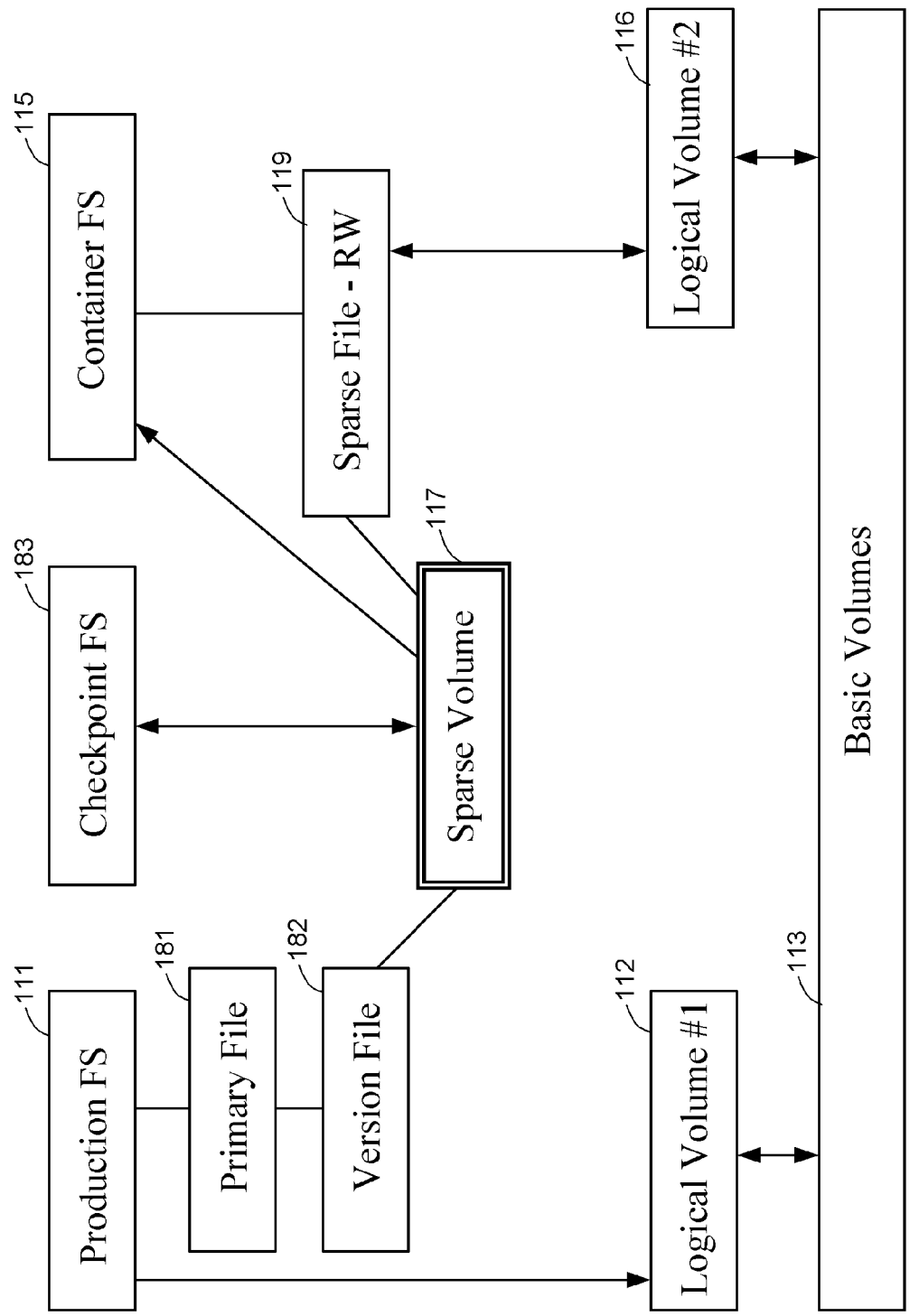
FIG. 13 shows how the software architecture of FIG. 8 can be used to manage snapshot copies of individual files.

FIG. 13 shows how the software architecture of FIG. 8 can be used to manage snapshot copies of individual files. A production file 181 is called the primary file, and its snapshot 182 is called a version file. The version files are included in a checkpoint file system 183. A version file can be a snapshot copy of a production file used as a volume or container for another file system or for storage of a logical unit number (LUN) of storage in accordance with the Internet Small Computer System Interface (iSCSI) protocol. The sparse volume 117 provides an abstraction for supporting snapshots of multiple kinds of datasets including volumes, file systems, and files.

Figure 14:
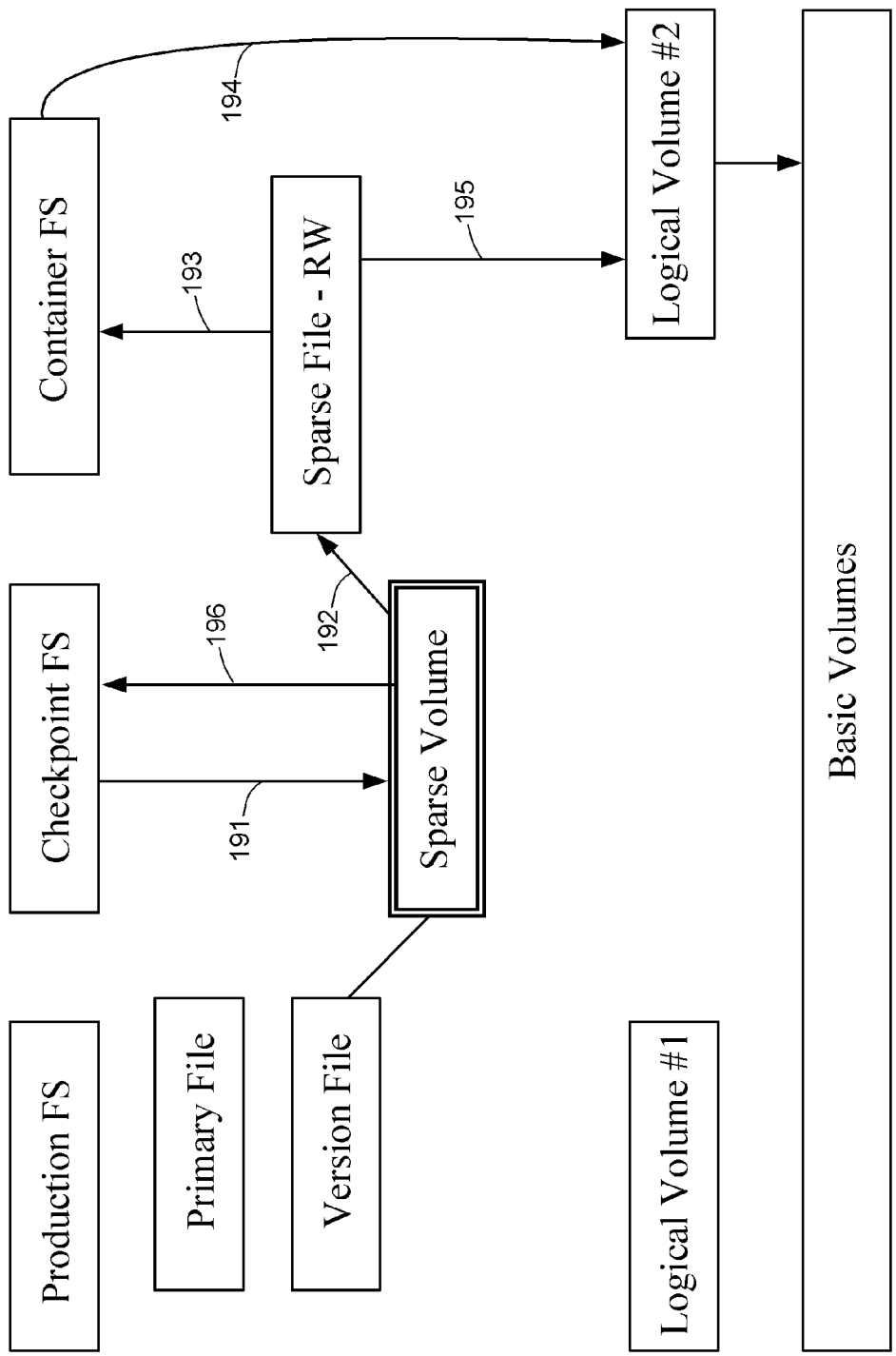
FIG. 14 shows data flow during a write operation when the sparse volume in FIG. 13 is used as an interface to a snapshot copy of a file.

FIG. 14 shows data flow during a write operation when the sparse volume in FIG. 13 is used as an interface to a snapshot copy of a file. In step 191 the checkpoint file system of the version file issues a write request to the sparse volume. In step 192 the sparse volume issues a write request to the RW sparse file. In step 193 the RW sparse file allocates the storage for the block if it has not been allocated already. In step 194, the container file system allocates a block of storage to the RW sparse file, and commits its transaction. In step 195, the RW sparse file commits the data either synchronously or asynchronously. In step 196, the sparse volume returns control to the checkpoint file system.

Figure 15:
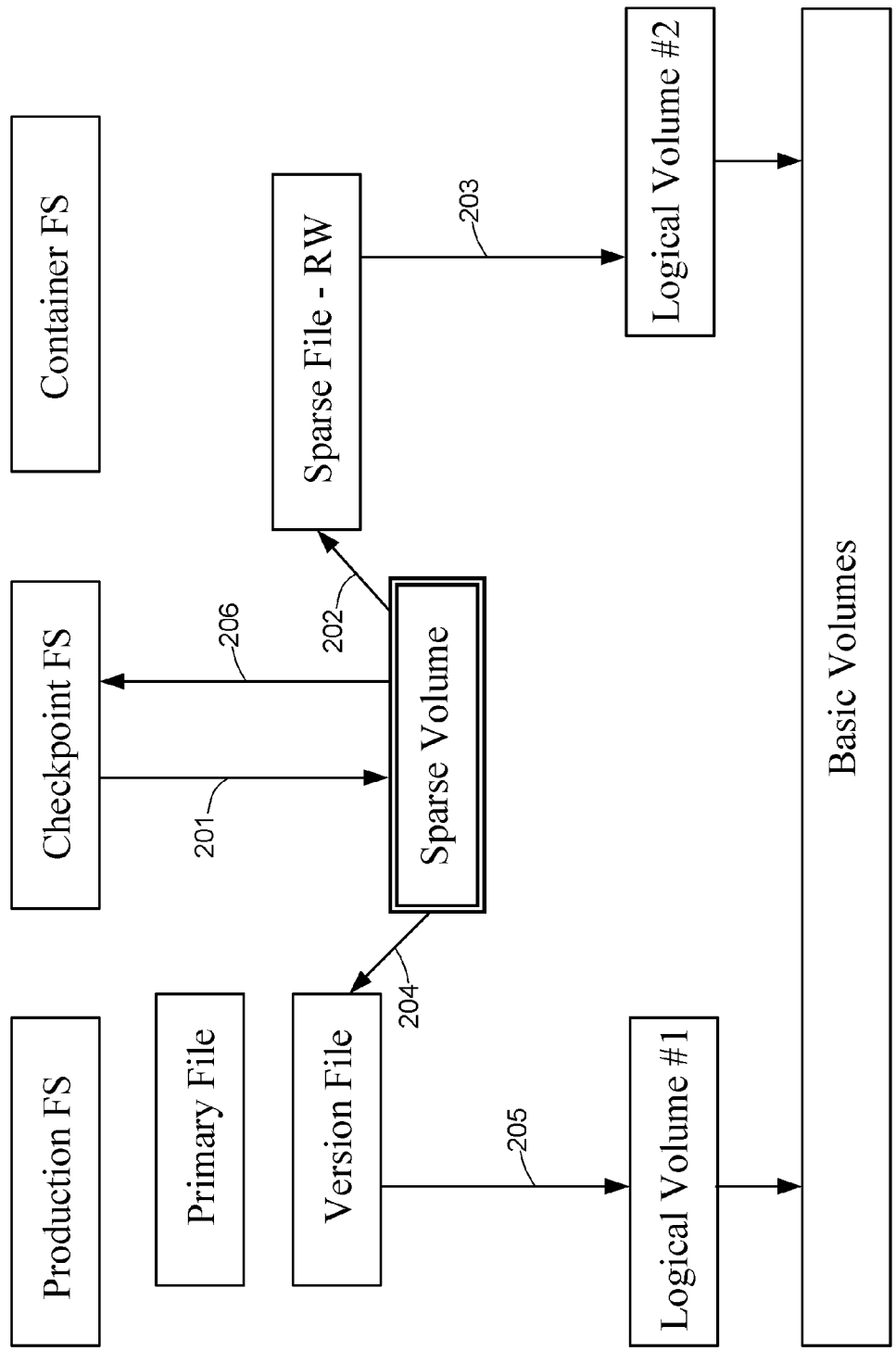
FIG. 15 shows data flow during a read operation when the sparse volume in FIG. 13 is used as an interface to a snapshot copy of a file.

FIG. 15 shows data flow during a read operation when the sparse volume in FIG. 13 is used as an interface to a snapshot copy of a file. In step 201, the checkpoint file system issues a read request to the sparse volume. In step 202, the sparse volume checks with the RW sparse file to determine whether the block has been written to the RW sparse file. If so, then in step 203, the RW sparse file reads data of the block from the second logical volume, which in turn reads the data from the backend disk storage. If the block has not been written to the RW sparse file, then in step 204 the sparse volume reads the data from the block in the version file. In step 205, the version file looks at its metadata to find the location of the block in the first logical volume, and then reads the data of the block from this location in the logical volume. The logical volume reads the data from the backend disk storage. Finally, in step 206, the data read from the block is returned to the checkpoint file system.

In view of the above, there has been described a snapshot copy facility that responds to a request for writing new data to a block of a production dataset by saving original data of the block of the production dataset, and writing the new data to the block of the production dataset and keeping a record of the blocks of the production dataset that have been changed since the point in time when the snapshot copy was created. For detection of corruption of the snapshot metadata and for portability of the snapshot copy software, a sparse file is used for keeping a record of the blocks of the production dataset that have been changed since the snapshot. A conventional file system recovery tool (e.g., FSCK) can operate upon the sparse file to detect corruption of the snapshot copy metadata.

For "copy on first write" snapshots, the sparse file is a "write once read many" (WORM) file to store original copies of blocks. When writing to a block in the production dataset, the block allocation map of the WORM sparse file is accessed to determine whether old data of the block in the production dataset should be copied to the WORM sparse file before new data should be written to the block in the production dataset.

For "remap on write" snapshots, the sparse file is a "read-write" (RW) file to which writes to the production file are stored. When reading a block in the production dataset, the block allocation map of the RW sparse file is accessed to determine whether the block should be read from the RW sparse file or from the snapshot.

For writable snapshots, a respective RW sparse file is used for storing changes made to a read-write snapshot since the time when the read-write snapshot was created. The read-write snapshot is based on a read-only snapshot. This read-only snapshot can be created and maintained by any method such as the "copy on first write" method or the "remap on write" method.

What is claimed is:

1. A method of operating at least one data processor for maintaining a production dataset in computer data storage, and during concurrent read-write access to the production dataset, also maintaining a snapshot copy of the production dataset, the snapshot copy being the state of the production dataset at a point in time when the snapshot copy is created, the production dataset including blocks of computer data, and the snapshot copy of the production dataset also including blocks of computer data, wherein the method comprises:

responding to a request for writing new data to a block of the production dataset by saving original data of the block of the production dataset, and writing the new data to the block of the production dataset, and keeping a record that the block has been changed in the production dataset since the point in time when the snapshot copy was created, wherein the record that the block has been changed in the production dataset since the point in time when the snapshot copy was created is kept by writing the new data or the original data to a sparse file so that blocks of the production dataset that have been changed since the point in time when the snapshot copy was created are indicated by a block allocation map of the sparse file.

2. The method as claimed in claim 1, wherein:

the new data is written to a block of the sparse file in response to the request for writing new data to a block of the production dataset; and in response to a request to read a specified block of the production dataset, the block allocation map of the sparse file is accessed to determine whether or not the specified block is allocated in the sparse file, and upon determining that the specified block is not allocated in the sparse file, then reading data of the specified block from the snapshot copy of the production dataset.

3. The method as claimed in claim 1, wherein:

the original data of the block in the production dataset is saved in response to the request for writing new data to a block of the production dataset by writing the original data to a block of the sparse file, and then writing the new data to the block of the production dataset; and in response to a request to read a specified block from the snapshot copy of the production dataset, the block allocation map of the sparse file is accessed to determine whether or not the specified block is allocated in the sparse file, and upon determining that the specified block is not allocated in the sparse file, then reading data of the specified block from the production dataset.

4. The method as claimed in claim 1, wherein the snapshot copy of the production dataset is a read-only snapshot copy, and the method further includes creating a read-write snapshot copy based on the read-only snapshot copy and responding to requests to make changes to blocks of the read-write snapshot copy since the point in time when the read-only snapshot copy was created by making the requested changes to the blocks of the read-write snapshot copy since the point in time when the read-only snapshot copy was created and using another sparse file for keeping a record of the requested changes made to the blocks of the read-write snapshot copy since the point in time when the read-only snapshot copy was created, wherein the requested changes to the blocks of the read-write snapshot copy since the point in time when the read-write snapshot copy was created are written to said another sparse file.

5. The method as claimed in claim 4, which further includes responding to a request to read a specified block of the read-write snapshot copy by accessing a block allocation map of said another sparse file to determine whether or not the specified block is allocated in said another sparse file, and upon determining that the specified block is not allocated in said another sparse file, then reading data of the specified block from the read-only snapshot copy.

6. The method as claimed in claim 1, which further includes said at least one data processor executing a file system manager of an operating system program to manage the sparse file, and said at least one data processor executing a snapshot copy facility program to maintain the snapshot copy of the production dataset during concurrent read-write access to the production dataset, wherein execution of the snapshot copy facility program calls an application program interface of the file system manager for accessing the block allocation map of the sparse file to determine whether or not a specified block has been allocated in the sparse file.

7. The method as claimed in claim 1, which further includes said at least one data processor executing a file system manager of an operating system program to manage the sparse file, and said at least one data processor executing a snapshot copy facility program to maintain the snapshot copy of the production dataset during concurrent read-write access to the production dataset, wherein execution of the snapshot copy facility program includes accessing a sparse volume, the sparse volume having logical addresses addressing the allocation map of the sparse file for determining whether or not a specified block has been allocated in the sparse file, and the sparse volume having logical addresses addressing the logical extent of the sparse file for reading or writing data blocks to the sparse file.

8. The method as claimed in claim 1, wherein the production dataset is a logical volume, the method includes storing attributes of the logical volume in attributes of the sparse file when the snapshot copy of the production dataset is created.

9. The method as claimed in claim 1, wherein the production dataset is a production file, and the method includes storing attributes of the production file in the sparse file when the snapshot copy of the production dataset is created.

10. A file server comprising, in combination:

computer data storage; and at least one data processor coupled to the computer data storage for writing computer data to the computer data storage and for reading the computer data from the computer data storage;

where said at least one data processor is programmed for maintaining a production dataset in the computer data storage, and during concurrent read-write access to the production dataset, also maintaining a snapshot copy of the production dataset, the snapshot copy being the state of the production dataset at a point in time when the snapshot copy is created, the production dataset including blocks of the computer data, and the snapshot copy of the production dataset also including blocks of the computer data, wherein said at least one data processor is programmed for responding to a request for writing new data to a block of the production dataset by saving original data of the block of the production dataset, and writing the new data to the block of the production dataset, and keeping a record that the block has been changed in the production dataset since the point in time when the snapshot copy was created, wherein said at least one data processor is programmed for keeping the record that the block has been changed in the production dataset by writing the new data or the original data to a sparse file so that blocks of the production dataset that have been changed since the point in time when the snapshot copy was created are indicated by a block allocation map of the sparse file.

11. The file server as claimed in claim 10, wherein:

said at least one data processor is programmed for writing the new data to a block of the sparse file in response to the request for writing new data to a block of the production dataset; and wherein said at least one data processor is programmed for responding to a request to read a specified block from the production dataset by accessing the block allocation map of the sparse file to determine whether or not the specified block is allocated in the sparse file, and if the specified block is allocated in the sparse file, then reading data of the specified block from the sparse file, and if the specified block is not allocated in the sparse file, then reading data of the specified block from the snapshot copy of the production dataset.

12. The file server as claimed in claim 10, wherein:

said at least one data processor is programmed for saving the original data of the block in the production dataset by writing the original data to a block of the sparse file, and said at least one data processor is programmed for responding to a request to read a specified block from the snapshot copy of the production dataset by accessing the block allocation map of the sparse file to determine whether or not the specified block is allocated in the sparse file, and if the specified block is allocated in the sparse file, reading data of the specified block from the sparse file, and if the specified block is not allocated in the sparse file, then reading data of the specified block from the production dataset.

13. The file server as claimed in claim 10, wherein the snapshot copy of the production dataset is a read-only snapshot copy, and said at least one data processor is further programmed for creating a read-write snapshot copy based on the read-only snapshot copy and responding to requests to make changes to blocks of the read-write snapshot copy since the point in time when the read-only snapshot copy was created by making the requested changes to the blocks of the read-write snapshot copy since the point in time when the read-only snapshot copy was created and using another sparse file for keeping a record of the requested changes made to the blocks of the read-write snapshot copy since the point in time when the read-only snapshot copy was created, wherein the requested changes to the blocks of the read-write snapshot copy since the point in time when the read-only snapshot copy was created are written to said another sparse file.

14. The file server as claimed in claim 13, wherein said at least one data processor is further programmed for responding to a request to read a specified block of the read-write snapshot copy by accessing a block allocation map of said another sparse file to determine whether or not the specified block is allocated in said another sparse file, and if the specified block is allocated in said another sparse file, then reading data of the specified block from said another sparse file, and if the specified block is not allocated in said another sparse file, then reading data of the specified block from the read-only snapshot copy.

15. The file server as claimed in claim 10, wherein said at least one data processor is programmed with a file system manager of an operating system program for managing the sparse file, and said at least one data processor is further programmed with a snapshot copy facility program for maintaining the snapshot copy of the production dataset during concurrent read-write access to the production dataset, wherein the file system manager program includes an application program interface called by the snapshot copy facility program for accessing the block allocation map of the sparse file to determine whether or not a specified block has been allocated in the sparse file.

16. The file server as claimed in claim 10, wherein said at least one data processor is programmed with an operating system including a file system manager program for managing the sparse file, and said at least one data processor is further programmed with a snapshot copy facility for maintaining the snapshot copy of the production dataset during concurrent read-write access to the production dataset, wherein execution of the snapshot copy facility program includes accessing a sparse volume, the sparse volume having logical addresses addressing the allocation map of the sparse file for determining whether or not a specified block is allocated in the sparse file, and the sparse volume having logical addresses addressing the logical extent of the sparse file for reading or writing data blocks to the sparse file.

17. A file server comprising, in combination:

computer data storage; and at least one data processor coupled to the computer data storage for writing computer data to the computer data storage and reading the computer data from the computer data storage;

wherein said at least one data processor is programmed with an operating system including a file system manager program for managing sparse files stored in the computer data storage, and said at least one data processor is also programmed with a snapshot copy facility program for maintaining a production dataset in the computer data storage, and during concurrent read-write access to the production dataset, also maintaining a snapshot copy of the production dataset, the snapshot copy being the state of the production dataset at a point in time when the snapshot copy is created, the production dataset including blocks of the computer data, and the snapshot copy of the production dataset also including blocks of the computer data, wherein the snapshot copy facility program is executable by said at least one data processor for responding to a request for writing new data to a block of the production dataset by saving original data of the block of the production dataset, and writing the new data to the block of the production dataset and keeping a record that the block of the production dataset has been changed since the point in time when the snapshot copy was created, wherein the snapshot copy facility program is executable by said at least one data processor for keeping the record that the block of the production dataset has been changed by writing the new data or the original data to a sparse file so that blocks of the production dataset that have been changed since the point in time when the snapshot copy was created are indicated by a block allocation map of the sparse file, wherein the snapshot copy facility is executable by said at least one data processor for responding to a request for reading a specified block of the production dataset or the snapshot copy by accessing the allocation map of the sparse file to determine whether or not the specified block is allocated in the sparse file, and upon determining that the specified block is allocated in the sparse file, reading the specified block from the sparse file, and wherein the file system manager includes an application program interface that is callable by the snapshot copy facility program for determining whether or not the specified block is allocated in the sparse file.

18. The file server as claimed in claim 17, wherein the snapshot copy of the production dataset is a read-only snapshot copy, and the snapshot copy facility program is executable by said at least one data processor for creating a read-write snapshot copy based on the read-only snapshot copy and responding to requests to make changes to blocks of the read-write snapshot copy since the point in time when the read-only snapshot copy was created by writing to another sparse file the requested changes to the blocks of the read-write snapshot copy since the point in time when the read-only snapshot copy of the production dataset was created.

19. The file server as claimed in claim 17, wherein the snapshot copy facility program defines a sparse volume, wherein the sparse volume has a logical address space including the allocation map of the sparse file and the logical extent of the sparse file, and wherein the snapshot copy facility is executable by said at least one data processor for accessing the logical address space of the sparse volume for accessing the allocation map of the sparse file for determining whether or not the specified block is allocated in the sparse file, and for accessing the logical address space of the sparse volume for reading the specified block from the sparse file upon determining that the specified block is allocated in the sparse file.

20. The file server as claimed in claim 19, wherein the snapshot copy of the production dataset is a read-only snapshot copy, and the snapshot copy facility program is executable by said at least one data processor for creating a read-write snapshot copy based on the read-only snapshot copy of the production dataset and responding to requests to make changes to blocks of the read-write snapshot copy since the point in time when the read-only snapshot copy was created by writing to another sparse file the requested changes to the blocks of the read-write snapshot copy since the point in time when the read-only snapshot copy of the production dataset was created, wherein the logical address space of the sparse volume includes an allocation map of said another sparse file and a logical extent of said another sparse file, and wherein the snapshot copy facility program is executable by said at least one data processor for writing to the sparse volume in order to write to said another sparse file the requested changes to the blocks of the read-write snapshot copy since the point in time when the read-only snapshot copy of the production dataset was created.

* * * * *